United States Patent
Chansarkar et al.

(10) Patent No.: US 8,248,301 B2
(45) Date of Patent: Aug. 21, 2012

(54) METHOD AND APPARATUS FOR USING GPS SATELLITE STATE COMPUTATIONS IN GLONASS MEASUREMENT PROCESSING

(75) Inventors: Mangesh Chansarkar, Irvine, CA (US); Keith Brodie, Tustin, CA (US); Makarand Phatak, Sunnyvale, CA (US); William Kerry Keal, Santa Clara, CA (US)

(73) Assignee: CSR Technology Holdings Inc., Sunnyvale, CA (US)

( * ) Notice: Subject to any disclaimer, the term of this patent is extended or adjusted under 35 U.S.C. 154(b) by 291 days.

(21) Appl. No.: 12/534,034

(22) Filed: Jul. 31, 2009

(65) Prior Publication Data
US 2011/0025559 A1 Feb. 3, 2011

(51) Int. Cl.
*G01S 19/33* (2010.01)
(52) U.S. Cl. .................................. 342/357.73
(58) Field of Classification Search .............. 342/357.73
See application file for complete search history.

(56) References Cited

U.S. PATENT DOCUMENTS

| | | | | |
|---|---|---|---|---|
| 5,422,817 A | 6/1995 | Tazates et al. | ................ | 702/93 |
| 5,890,093 A | 3/1999 | Mark et al. | ................ | 701/220 |
| 5,928,309 A | 7/1999 | Korver et al. | ................ | 701/214 |
| 6,282,496 B1 | 8/2001 | Chowdhary | ................ | 701/220 |
| 6,285,954 B1 | 9/2001 | Mark et al. | ................ | 701/221 |
| 6,532,419 B1 | 3/2003 | Begin et al. | ................ | 701/220 |
| 6,647,352 B1 | 11/2003 | Horton | ................ | 701/151 |
| 6,782,315 B2 | 8/2004 | Lu | ................ | 701/45 |
| 6,801,855 B1 | 10/2004 | Walters et al. | ................ | 701/216 |
| 7,142,157 B2 | 11/2006 | Garin et al. | ................ | 342/357.15 |
| 7,248,964 B2 | 7/2007 | Bye | ................ | 701/200 |
| 7,286,933 B2 | 10/2007 | Cho | ................ | 701/216 |
| 7,337,650 B1 | 3/2008 | Preston et al. | ................ | 73/1.38 |
| 7,403,154 B2 | 7/2008 | Garin et al. | ................ | 342/357.15 |
| 7,436,357 B2 | 10/2008 | Wang et al. | | |
| 2002/0022924 A1 | 2/2002 | Begin | ................ | 701/207 |
| 2004/0036650 A1 | 2/2004 | Morgan | ................ | 342/357.14 |
| 2004/0049326 A1* | 3/2004 | Diggelen et al. | ................ | 701/13 |

(Continued)

FOREIGN PATENT DOCUMENTS

WO WO 00/17601 3/2000

(Continued)

OTHER PUBLICATIONS

Garin et al., "A Novel Ephemeris Extension Compaction/Decompaction Method", Proc. of the 63$^{rd}$ Ion Annual Meeting, Apr. 23, 2007, pp. 504-510.

*Primary Examiner* — Harry Liu
(74) *Attorney, Agent, or Firm* — Pillsbury Winthrop Shaw Pittman LLP (57) ABSTRACT

The present invention is related to location positioning systems, and more particularly, to a method and apparatus for using satellite state information from two or more different satellite systems in navigation processing. According to one aspect, it makes use of GPS extended ephemeris functionality to produce satellite state vector estimates for GLONASS satellites. These satellite state vector estimates can be used alone or in combination with GPS satellite vectors to provide updates to the receiver's navigation processing. According to further aspects, the GLONASS satellite position and trajectory information is extrapolated with a GPS gravity model rather than the GLONASS model, thereby allowing it to be extrapolated more accurately and for longer periods of time than the GLONASS model allows.

18 Claims, 4 Drawing Sheets

U.S. PATENT DOCUMENTS

| | | | |
|---|---|---|---|
| 2007/0247354 A1 | 10/2007 | Garin et al. | 342/357.03 |
| 2008/0129593 A1 | 6/2008 | Garin et al. | 342/357.15 |
| 2008/0191936 A1 | 8/2008 | Phatak et al. | 342/357.03 |
| 2008/0238765 A1 | 10/2008 | Zhang et al. | 342/357.01 |
| 2010/0013705 A1 * | 1/2010 | Syrjarinne et al. | 342/357.09 |

FOREIGN PATENT DOCUMENTS

| | | |
|---|---|---|
| WO | WO 02/18873 | 3/2002 |
| WO | WO 2007/059134 | 5/2007 |
| WO | WO 2007/099196 | 9/2007 |
| WO | WO 2009/129346 | 10/2009 |

* cited by examiner

METHOD AND APPARATUS FOR USING GPS SATELLITE STATE COMPUTATIONS IN GLONASS MEASUREMENT PROCESSING

FIELD OF THE INVENTION

The present invention is related to location positioning systems, and more particularly, to a method and apparatus for using satellite state information from two or more different satellite systems (e.g. GPS, GALILEO and GLONASS systems, individually or in combination with one another) in navigation processing.

BACKGROUND OF THE INVENTION

With the development of radio and space technologies, several satellites based navigation systems (i.e. satellite positioning system or "SPS") have already been built and more will be in use in the near future. SPS receivers, such as, for example, receivers using the Global Positioning System ("GPS"), also known as NAVSTAR, have become commonplace. Other examples of SPS systems include but are not limited to the United States ("U.S.") Navy Navigation Satellite System ("NNSS") (also known as TRANSIT), LORAN, Shoran, Decca, TACAN, NAVSTAR, the Russian counterpart to NAVSTAR known as the Global Navigation Satellite System ("GLONASS") and any existing or future Western European, Chinese, Japanese, Indian or other SPS such as the Galileo program.

The most commonly used system in the U.S., the GPS system, was built and is operated by the United States Department of Defense. The system uses twenty-four or more satellites orbiting the earth at an altitude of about 11,000 miles with a period of about twelve hours. These satellites are placed in six different orbits such that at any time a minimum of four satellites are visible at any location on the surface of the earth except in the polar region at all times. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

A GPS receiver typically has to acquire and lock onto at least four satellite signals in order to derive the position and time. Usually, a GPS receiver has many parallel channels with each channel receiving signals from one visible GPS satellite. The signals from the navigational satellites are modulated with navigational data at 50 bits/second (i.e. 1 bit/20 msec). This navigational data consists of ephemeris, almanac, time information, clock and other correction coefficients. It also contains information about ionospheric corrections, satellite constellation health and other associated information needed to correctly and reliably compute receiver's position and time.

The almanac and ephemeris are used in the computation of the position of the satellites at a given time. The almanacs are valid for a longer period of six days or much longer but provide a less accurate satellite position and Doppler compared to ephemeris. The accuracy of the satellite position and velocity degrades with older almanac data. For example, the accuracy of satellite position and velocity computed with one week old almanac would be better than that computed using one month old almanac. Therefore, almanacs are not used when an accurate position fix is required. On the other hand, the accuracy of the computed receiver position depends upon the accuracy of the satellite positions which in-turn depends upon the age of the ephemeris. The use of current ephemeris results in better and faster position estimation than one based on non-current or obsolete ephemeris. Therefore, it is necessary to use current ephemeris to get a fast and accurate receiver position fix.

A GPS receiver may acquire the signals and estimate the position depending upon the already available information. In the "hot start" mode the receiver has current ephemeris and further the approximate position and time are known. In another mode known as "warm start" the receiver has non-current ephemeris (or does not have ephemeris) and the initial position and time are known less accurately than in the case of previous "hot start." In the third mode, known as "cold start," the receiver has no knowledge of approximate position, time or ephemeris. As expected, the "hot start" mode results in low Time-To-First-Fix (TTFF) while the "warm start" mode which if it has non-current ephemeris may use that ephemeris or the almanac resulting in longer TTFF due to non availability of current ephemeris. The "cold start" takes still more time for the first position fix as there is no data available to aid signal acquisition and position fix.

Therefore, it is desirable to keep the ephemeris in the receiver current for a fast TTFF. Current ephemeris also helps when the received signal is weak and the ephemeris can not be downloaded. Some issued patents teach receiving the ephemeris through an aiding network or remote server instead of from an orbiting satellite (i.e. an assisted GPS server providing current ephemeris obtained from reference receivers with full view of the sky or server generated extended ephemeris or SGEE). However, this approach results in higher cost and requires additional infrastructure. Another approach to keeping ephemeris current, without using a remote server, is to automatically download it from satellites in the background, such as described in U.S. Pat. No. 7,436,357.

Some commercially available products such as SiRF InstantFixII from SiRF Technologies of San Jose, Calif. use extended ephemeris to improve start-up times without requiring network connectivity (i.e. client generated extended ephemeris or CGEE). With one observation of a satellite, SiRFInstantFixII accurately predicts that satellite's position for up to three days—removing the need to download satellite ephemeris data at subsequent start-ups—resulting in full navigation in as little as five seconds, and with routine 7 meter accuracy. Moreover, such extended ephemeris products not only start tracking satellites and navigating more quickly, they can do it using signals much weaker than those needed to obtain satellite ephemeris data the traditional way, removing the barrier that often blocks successful navigation under tough GPS signal conditions.

Nevertheless, some challenges remain. For example, the orbits of GPS satellites are inclined at 55 degrees, which causes the line-of-sight (LOS) between a receiver and the satellite to be closer to the horizon when a receiver is nearer to the Earth's poles. This can cause reception and tracking problems, especially with nearby objects such as buildings or trees. Also in situations where there is significant blockage of sky (for example, small streets with tall buildings on all sides) sufficient number of GPS satellites may not be available to make an accurate position computation.

These and similar problems could be lessened if it were possible to use satellites from other systems, additionally or alternatively to GPS satellites, when performing navigation for a single user. For example, satellites from the GLONASS system can provide better LOS to receivers when they are at higher latitudes. Moreover, the availability of satellites with different orbits than GPS satellites also provides more flexibility in "urban canyon" and other types of difficult LOS environments. However, GLONASS and other satellite systems have different data formats, which do not easily allow integration with GPS solutions, including extended ephemeris technologies.

Accordingly, a need remains for an accurate and reliable way to use satellite state and/or ephemeris information when performing satellite-based navigation with satellites from two or more systems, including performing extended ephemeris with such mixed systems.

SUMMARY OF THE INVENTION

The present invention is related to location positioning systems, and more particularly, to a method and apparatus for using satellite state information from two or more different satellite systems in navigation processing. According to one aspect, it makes use of GPS extended ephemeris functionality to produce satellite state vector estimates for GLONASS satellites. These satellite state vector estimates can be used alone or in combination with GPS satellite vectors (or satellite state vectors from other satellite systems) to provide updates to the receiver's navigation processing. According to further aspects, the GLONASS satellite position and trajectory information is extrapolated with a GPS gravity model rather than the GLONASS model, thereby allowing it to be extrapolated more accurately and for longer periods of time than the GLONASS model allows.

In furtherance of the above and other aspects, a method for performing location positioning according to the invention includes receiving satellite state information for a first satellite in a first satellite positioning system, and for a second satellite in a different second satellite positioning system; and synthesizing the satellite state information for both the first and second satellites into a common record format of satellite orbit or ephemeris information.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to general aspects, the invention adapts ephemeris prediction (e.g. CGEE) functionality for GPS receivers to produce satellite state vector estimates for receivers capable of communicating with one or more other global navigation satellite systems such as GLONASS satellites. These satellite state vector estimates can then be used in combination with measurements made on the GLONASS and/or GPS signals to provide updates to the receiver's navigation state.

Figure 1:
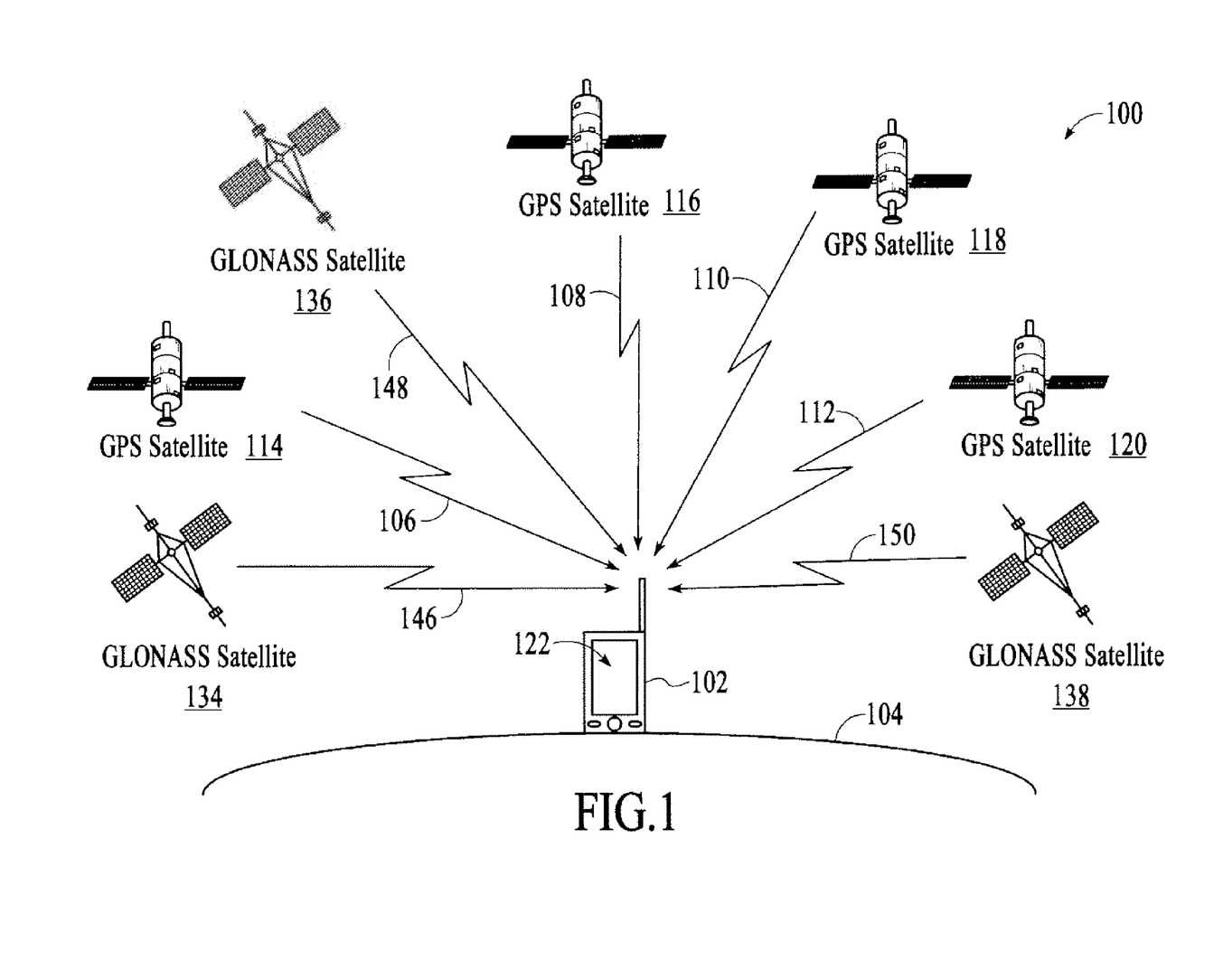
FIG. 1 is a block diagram of an example implementation of principles of the invention.

FIG. 1 illustrates an example satellite-based navigation system 100 for implementation of embodiments of the invention. As shown in FIG. 1, GPS satellites (i.e. SVs) 114, 116, 118 and 120 broadcast signals 106, 108, 110 and 112, respectively, that are received by receiver 122 in handset 102, which is located at a user position on or somewhere relatively near the surface 104 of earth. As further shown in FIG. 1, other navigation system satellites (e.g. satellites in the GLONASS system) 134, 136 and 138 broadcast signals 146, 148 and 150, respectively, that are further or alternatively received by receiver 122 in handset 102. It should be apparent that, at any point in time, receiver 122 may receive signals from fewer or additional satellites and/or additional or alternative navigation system satellites. However, the invention will be described below in connection with one possible embodiment of using signals from GPS and GLONASS satellites.

Handset 102 can be a personal navigation device (PND, e.g. from Garmin, TomTom, etc.) or it can be a cell or other type of telephone with built-in GPS and/or GLONASS functionality, or any GPS and/or GLONASS device embedded in tracking applications (e.g. automotive tracking from Trimble, package or fleet management tracking from FedEx, child locator tracking applications etc).

Receiver 122 can be implemented using software and/or hardware, including GPS chipsets such as SiRFstarIII GSD3tw or SiRFstar GSC3e from SiRF Technology and BCM4750 from Broadcom Corp., as adapted and/or supplemented with GLONASS receiver and other functionality in accordance with the present invention, and described in more detail herein. More particularly, those skilled in the art will be able to understand how to implement the present invention by adapting and/or supplementing such chipsets and/or software with additional satellite signal receiver functionality and the system format conversion techniques of the present invention after being taught by the present specification.

Signals 106, 108, 110 and 112 are well-known GPS signals in which binary codes modulate the satellite's transmitted L1 and/or L2 carrier. Of particular interest, the C/A Code (Coarse Acquisition) modulates the L1 carrier. The C/A code is a repeating 1 MHz Pseudo Random Noise (PRN) Code. This noise-like code modulates the L1 carrier signal, "spreading" the spectrum over a large (i.e. greater than 1 MHz) bandwidth. The C/A code repeats every 1023 chips (one millisecond). There is a different C/A code PRN for each SV. GPS satellites are often identified by their PRN number, the unique identifier for each pseudo-random-noise code. The C/A code that modulates the L1 carrier is the basis for the civil uses of GPS.

Signals 136, 138 and 140 are, for example, GLONASS signals that also use the L1 and/or L2 sub-bands. Differently from GPS, GLONASS uses frequency division multiple access (FDMA) rather than the unique PRN codes to distinguish unique satellites. Accordingly, each satellite (or satellites in antipodal pairs) has its own carrier frequency (separated by 562.5 kHz for L1 and 437.5 kHz for L2) within the L1, L2 sub-bands. In further contrast to GPS, all the GLONASS satellites use the same PRN code to modulate the carrier. So two antipodal (diametrically opposite in orbit location) GLONASS satellites can be transmitting on the same carrier frequency.

In embodiments, receiver 122 includes functionality to lock onto and extract information from both GPS signals and GLONASS signals at the same time. There are many conventional and proprietary ways that this receiver functionality can be implemented in receiver 122 which are not necessary for understanding the principles of the invention, and so even further detailed descriptions thereof will be omitted for clarity of the invention. Those skilled in the art will be able to adapt such conventional and/or proprietary functionality with the format conversion functionality of the present invention after being taught by the present disclosure.

As is known, signals from at least four SVs (GPS and/or GLONASS) are usually needed before receiver 122 can provide a 3-dimensional navigation solution (only three satellites are required for a 2-dimensional navigation solution, e.g. by using known height). As is known, computing a navigation solution using trilateration requires information about the current clock and position of satellites being tracked, which is usually obtained from ephemeris data. As mentioned above, it takes time to download ephemeris (usually over 30 seconds), which greatly increases TTFF in conditions where up-to-date ephemeris is not already available (e.g. a "cold start"). Accordingly, ephemeris extension technologies attempt to reduce TTFF by using previously predicted satellite position and clock for the current period based on stored or received ephemeris information instead of waiting for current ephemeris downloading from satellites. Most ephemeris extension technologies perform numerical integration from a given initial point in time associated with the stored ephemeris information to a user specified time (usually the time when the receiver is first turned on and ready to navigate). The predicted satellite position is then used in the navigation solution until a new set of broadcast ephemeris information is received.

Figure 2:
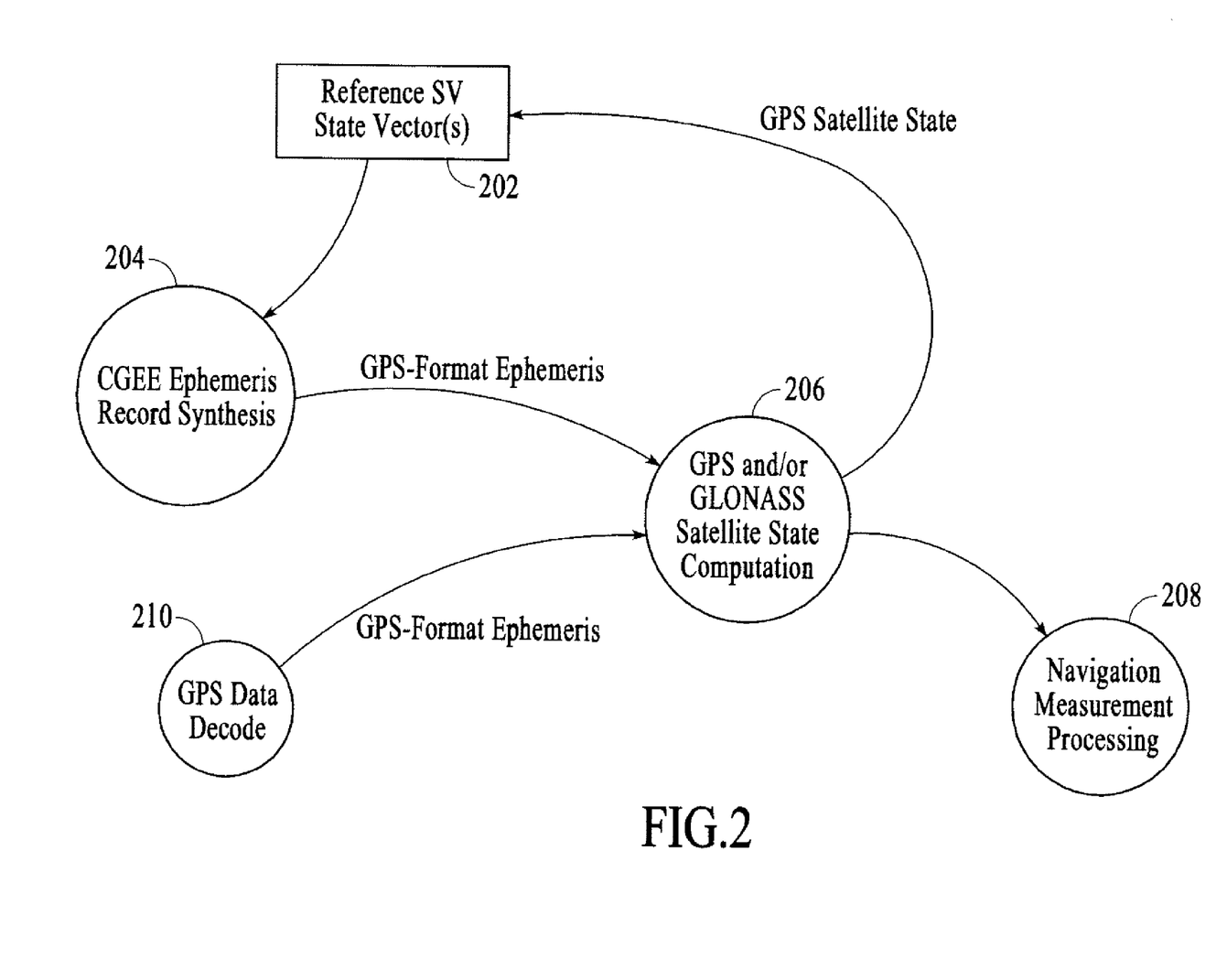
FIG. 2 is a diagram illustrating an example implementation of providing and using GPS extended ephemeris information in a navigation solution.

FIG. 2 shows one existing mechanism for CGEE processing for GPS signals. One or more GPS satellite state vectors 202 are computed and stored from previous GPS broadcast ephemeris. These state vectors are used in the CGEE processing to synthesize a GPS ephemeris record for any predicted future segment in time in 204. The GPS ephemeris record includes ephemeris data that is in the same format as obtained from broadcast ephemeris or ephemeris data in an alternative compressed position-acceleration format, and is extrapolated from the time that the ephemeris was stored to, for example, the time when the receiver is first turned on and ready to navigate. The synthesized record is handed to the satellite state computation function 206 to support state computation when no valid broadcast GPS satellite data is available, which in turn enables navigation processing 208. The satellite state data includes the satellite position, velocity, clock and trajectory at the particular point in time needed for navigation processing.

It should be noted that GPS satellite state vectors 202 are preserved for all or as many as possible of the unique GPS SVs. Moreover, additionally or alternatively to being synthesized at one time, CGEE processing can be performed so that ephemeris records are produced and/or stored by process 204 for one or more SVs at multiple predicted points in time in the future, and then selectively used by state computation function 206 as needed (e.g. depending on which SV's signals are being received when the receiver is first turned on). Those skilled in the art will understand various alternatives and embodiments after being taught by the present disclosure.

When the receiver is actively receiving data from a GPS satellite, and when sufficient GPS satellite data has been decoded in 210, the broadcast ephemeris is provided to state computation function 206, which performs satellite state computation for the broadcasting SVs using the broadcast data. As shown in FIG. 2, this satellite state data is used by navigation 208, but is also used to update the state vectors 202 for the respective satellite.

As set forth above, according to certain aspects, the invention adapts GPS CGEE processing, such as that illustrated in connection with FIG. 2, for use with GLONASS signal processing, thereby allowing either or both of GPS and GLONASS satellite signals that are commonly received by receiver 122 to be used in navigation solution processing in a consistent way without need for additional transformations.

The approach of the present invention differs from other possible and/or conventional approaches, such as deriving, maintaining and using satellite state information for GPS and GLONASS satellites using separate processing. The present inventors recognize that transforming the GLONASS SV states into common CGEE compatible SV states have many advantages compared to keeping the SV states in the GLONASS system form.

First, for example, the time of applicability of the SV state model is considerably enhanced. The GLONASS SV state model is typically applicable for only 30 minutes and a new GLONASS SV state description needs to be downloaded from the GLONASS SVs if the GLONASS SV states are kept in that form. Using the CGEE form of the invention allows the GLONASS SV states' validity to be extended up to 3 days so new GLONASS SV state information need not be downloaded from GLONASS SVs every 30 minutes or so. This allows for extended GLONASS operation in harsh urban/indoor conditions where downloading SV state data may not be always possible for extended periods of time. This also allows use of GLONASS satellite measurements when the receiver is starting up before the GLONASS SV State data is downloaded from the satellites there by providing the same TTFF improvements that are obtained in GPS only starts with CGEE (for example in warm start conditions or hot start conditions with the receiver being OFF for more than 30 minutes).

Second, using the SV states in CGEE form according to the invention is more accurate than using the GLONASS SV states in the GLONASS form. The GLONASS data provides a simple gravity model for extrapolation which is only applicable over about 30 minutes or so. The errors grow as the time for extrapolation grows. The CGEE gravity model used according to the invention is more elaborate and more accurate, allowing GLONASS SV states to be extrapolated much longer than the GLONASS model allows.

Third, using CGEE form allows the GLONASS SV states to be represented in the same reference frame as GPS. So additional reference frame transformation is not required when using GLONASS data in conjunction with GPS data.

Figure 3:
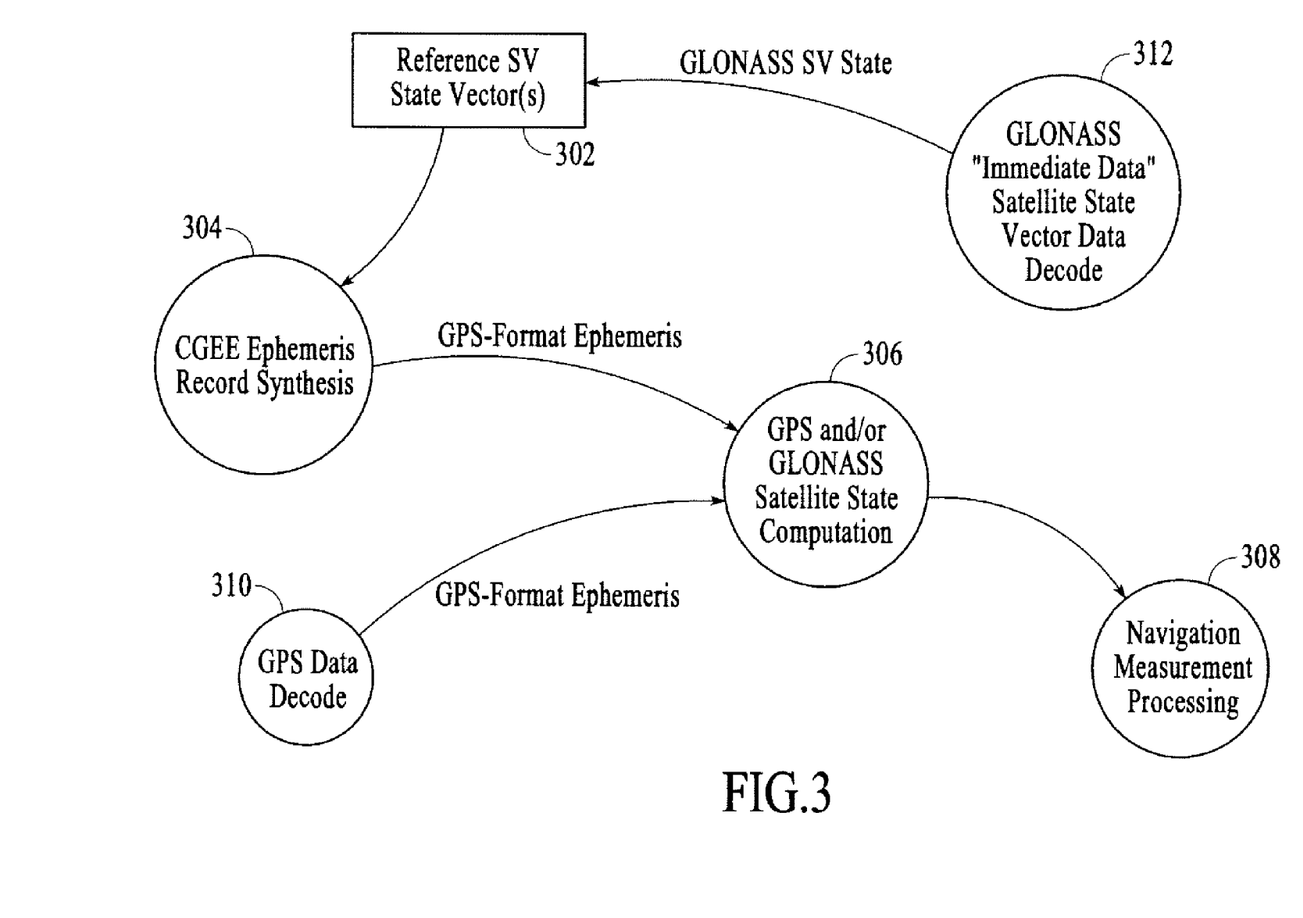
FIG. 3 is a diagram illustrating an example implementation of providing and using GPS and GLONASS extended ephemeris information in a navigation solution according to aspects of the present invention.

FIG. 3 illustrates aspects of an example embodiment of the invention. In FIG. 3, elements 302 to 310 can be implemented similarly to elements 202 to 210 in FIG. 2, respectively, except as set forth in more detail below. In the embodiment of FIG. 3, process 320 is further included so that the broadcast (i.e. "immediate") GLONASS satellite state-vector, when downloaded from a GLONASS satellite, is stored in 302 along with updated GPS state vectors (the line from 306 to 302 is omitted in FIG. 3 for clarity of the invention). When needed, the GLONASS state vectors are fed to the GPS ephemeris record synthesis process 304 in addition to or alternatively to GPS state vectors. According to aspects of the invention, process 304 includes the ability to generate a GPS-formatted ephemeris record that represents a GLONASS satellite orbit. This record is used in the rest of the state computations with minimal modification to the processes described in connection with FIG. 2.

One example mechanism that can be included in receiver 122 for accomplishing the functionality shown in FIG. 3 will now be described in more detail in connection with FIG. 4. First, in step S402, when data from a GLONASS satellite is being received by a receiver such as receiver 122, the GLONASS satellite state information is saved by process 312. In some embodiments, this state information is stored in store 302 along with GPS state vectors. In other embodiments, the GLONASS state information is stored separately.

In either event, like GPS broadcast ephemeris, the GLONASS satellite state information comes from the GLONASS navigation message (i.e. "immediate" information) and includes the following data (see, for example, the GLONASS Interface Control Document Version 5.0 (2002)):

Words $X_n(t_b)$, $Y_n(t_b)$, $Z_n(t_b)$ are the coordinates of n-satellite in PZ-90 coordinate system at the instant $t_b$;

Words $X'_n(t_b)$, $Y'_n(t_b)$, $Z'_n(t_b)$ are the velocity vector components of n-satellite in PZ-90 coordinate system at the instant $t_b$; and Words $X''_n(t_b)$, $Y''_n(t_b)$, $Z''_n(t_b)$ are the acceleration components of n-satellite in PZ-90 coordinate system at the instant $t_b$, which are caused by effect of the sun and the moon.

GLONASS time such as tb is also received along with the above information and is given as:

$t_{GLONASS} = UTC(SU) + 03$ hours 00 minutes which corresponds to Moscow time.

In step S404, time tb is converted to GPS time (GPS week and GPS time of week) by first converting the GLONASS time to UTC time using the above equation, then by converting UTC to GPS time by the well-known standard conversion for GPS processing. In some embodiments, this and the following processing can be performed by process 304 in FIG. 3. The PZ-90 Earth-Centered Earth-Fixed (ECEF) reference frame of the GLONASS system is defined as follows:

The ORIGIN is located at the center of the Earth's body;

The Z-axis is directed to the Conventional Terrestrial Pole as recommended by the International Earth Rotation Service (IERS);

The X-axis is directed to the point of intersection of the Earth's equatorial plane and the zero meridian established by BIH;

The Y-axis completes the coordinate system to the right-handed one.

Figure 4:
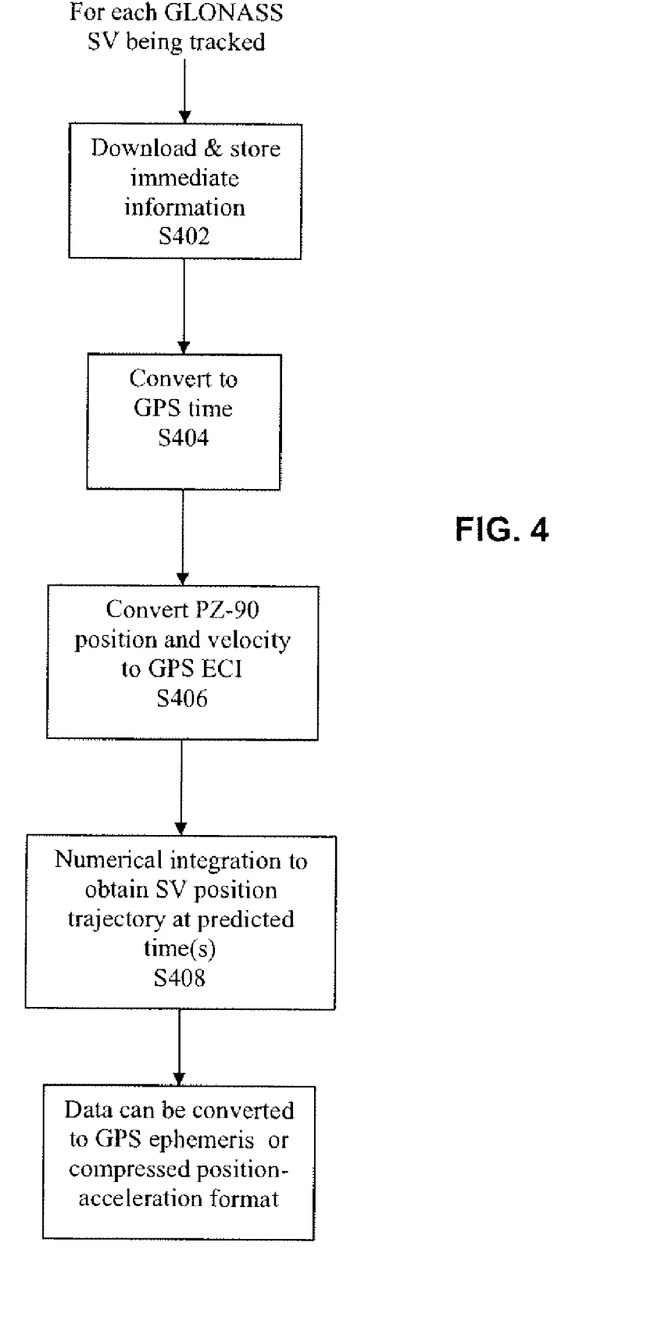
FIG. 4 is a flowchart illustrating an example method of making GLONASS satellite state information usable with GPS extended ephemeris information in accordance with aspects of the invention.

As shown in FIG. 4, in step S406, the PZ-90 satellite position and velocity coordinates are converted to GPS ECEF coordinates first and then to inertial ECI coordinates using Earth orientation information stored in the form of a polynomial using known or proprietary techniques familiar to those skilled in the art. The inertial frame is with respect to a reference epoch. One reference epoch that can be used in embodiments of the invention is the J2000 or Jan. 1, 2000, 12 hours (noon) epoch. At this epoch the Earth Centered Earth Fixed coordinate frame (ECEF) axes xyz and the Earth fixed inertial coordinate frame (ECI) axes XYZ are aligned. One example ECEF to ECI reference frame conversion technique is described in GPS-ICD-200.

Next, in step S408, starting from GLONASS satellite position and velocity in ECI coordinates, satellite dynamical equations are numerically integrated using appropriate numerical integration method (for example Runga Kutta Nystrom double integration method to start with and then more efficient multi-step Stroemer-Cowell method, both of which are known to those skilled in the art. The forces used in numerical integration include: spherical and non-spherical Earth gravity, Lunar and solar gravity (with Lunar and solar positions obtained in ECI coordinates) and solar radiation pressure. Example techniques that can be used to implement this processing are described in U.S. Pat. No. 7,142,157 and U.S. Patent Publ. No. 2008/0129593, the contents of which are incorporated herein by reference in their entirety.

Depending on the time interval of prediction for which numerical integration is performed the model of the forces can be simplified. A prediction time of from 4 hours to 3 days is achievable. It should be noted that satellite parameters for more than one predicted time can be generated and maintained, then selectively used based on the time a satellite is visible, for example.

As shown in FIG. 4, the predicted satellite position trajectory provided in step S408 can be converted into either 1) modified Kepler parameter or broadcast GPS ephemeris parameter format (such as used by process 306) or 2) compressed position-acceleration format. Using format 1), the position and velocity of the satellite at any required time (typically depending on the measurement time of signal reception) can be obtained in GPS ECEF frame by solving modified Kepler equations as described in GPS-ICD-200 and using format 2) in ECI frame (which then is converted to ECEF frame) by taking appropriate numerical integration step(s) to the required time.

It should be noted that GLONASS satellite position and velocity in PZ-90 frame can be obtained by appropriate inverse transformations, but would typically not be needed in some embodiments.

It should be noted that various different system architectures can be used in receiver 122 to embody the methodology of the present invention such as discrete GPS/GLONASS chipsets and GPS and/or GLONASS SOCs.

For example, receiver 122 can include a separate host chip, a GPS chip(s) and a GLONASS chip(s). In example embodiments, the host chip can be implemented using a conventional CPU such as those provided by Intel, AMD, Freescale, ARM and others, perhaps as adapted with software having the ephemeris validation functionality of the present invention. In similar or other embodiments, the GPS chip(s) can be implemented using a SiRFStar III, and the GLONASS chip(s) can be implemented using different commercially available chips, perhaps as adapted for use with the present invention. In other embodiments, the GPS and GLONASS processing may be combined on a single integrated chip.

In these and other implementations, the host chip can include a client location manager (CLM) and an extended ephemeris (EE) engine and associated data and program memories. The CLM generally includes functional components for managing the collection and storage of broadcast ephemeris downloaded by the GPS chip(s) and GLONASS chip(s), and for managing and scheduling the calculation of extended ephemeris calculated by the EE engine. The EE engine can generally include functional components for calculating extended ephemeris based on received and/or stored broadcast ephemeris. Of particular note, EE engine according to aspects of the invention can includes GLONASS format conversion functionality such as that described herein. Moreover, the host and/or GPS/GLONASS chip(s) can include functionality for performing navigation solution processing.

Additionally or alternatively, embodiments of the invention can be implemented on a system on a chip (SOC). Example platforms that can be adapted for use with the invention include SiRF Prima, Titan and Atlas SOCs, as supplemented with GLONASS receiver functionality and the format conversion functionality as described herein.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
   receiving, by a GNSS receiver apparatus, satellite state information for a first satellite in a first satellite positioning system, and for a second satellite in a different second satellite positioning system; and
   synthesizing, using a processor in the GNSS receiver apparatus, the satellite state information for both the first and second satellites into a common record format of satellite orbit or ephemeris information by representing the satellite state information received from both the first satellite positioning system and the second satellite positioning system in a same reference frame.

2. A method according to claim 1, wherein the step of receiving the satellite state information for one or both of the first and second satellites includes retrieving all of the information from stored records.

3. A method according to claim 1, further comprising decoding all the satellite state information for one or both of the first and second satellites from satellite signals.

4. A method according to claim 1, further comprising:
   using the satellite orbit or ephemeris information from the first and second satellites for satellite signal acquisition and navigation measurement processing.

5. A method according to claim 1, wherein one of the first and second satellite positioning systems is GPS.

6. A method according to claim 1, wherein one of the first and second satellite positioning systems is GLONASS.

7. A method according to claim 1, wherein the common format comprises GPS format ephemeris.

8. A method according to claim 6, wherein synthesizing the satellite state information for the GLONASS system satellite includes:
   converting GLONASS time associated with the satellite state information to GPS time; and
   converting GLONASS satellite position and velocity from coordinates in a PZ-90 frame to a GPS ECEF frame.

9. A method according to claim 8, further comprising:
   numerically integrating the synthesized satellite state information to obtain a position trajectory for the GLONASS system satellite at a predicted time.

10. A method according to claim 9, wherein the numerically integrating step includes applying earth, lunar and solar gravity.

11. A method according to claim 8, further comprising:
    converting the GLONASS satellite position and velocity from coordinates in the GPS ECEF frame to an inertial frame; and
    numerically integrating the synthesized satellite state information to obtain a position trajectory for the GLONASS system satellite at a predicted time.

12. A method according to claim 11, wherein the numerically integrating step includes applying earth, lunar and solar gravity in the inertial frame.

13. A method according to claim 6, wherein the synthesizing step includes numerically integrating GLONASS system satellite position information using earth, lunar and solar gravity in an inertial frame.

14. A method according to claim 1, further comprising:
    commonly receiving signals from the first satellite and from the second satellite in a single device; and
    processing the signals, using the single device, to obtain information corresponding to the satellite state information.

15. An apparatus comprising circuitry that performs the method of claim 1.

16. An apparatus comprising circuitry that performs the method of claim 8.

17. An apparatus comprising circuitry that performs the method of claim 14.

18. An apparatus, comprising:
    a common location manager that includes:
    an input coupled to receive satellite state information for a first satellite in a first satellite positioning system,
    an input coupled to receive satellite state information for a second satellite in a different second satellite positioning system; and
    an engine adapted to synthesize the satellite state information for both the first and second satellites into a common record format of satellite orbit or ephemeris information by representing the satellite state information received from both the first satellite positioning system and the second satellite positioning system in a same reference frame.

* * * * *